Oct. 16, 1928.

G. B. SCARLETT 1,688,023

REFRIGERATING UNIT

Filed April 24, 1926

2 Sheets-Sheet 1

WITNESS:
Robt R Kitchel.

INVENTOR
George B. Scarlett
BY
Robert M. Barr
ATTORNEY.

Oct. 16, 1928.

G. B. SCARLETT

REFRIGERATING UNIT

Filed April 24, 1926   2 Sheets-Sheet 2

INVENTOR
George B. Scarlett
BY
Robert M. Barr
ATTORNEY.

WITNESS:

Patented Oct. 16, 1928.

1,688,023

UNITED STATES PATENT OFFICE.

GEORGE B. SCARLETT, OF KENNETT SQUARE, PENNSYLVANIA, ASSIGNOR TO GLACIFER COMPANY, OF KENNETT SQUARE, PENNSYLVANIA, A CORPORATION OF DELAWARE.

REFRIGERATING UNIT.

Application filed April 24, 1926. Serial No. 104,394.

The present invention relates to refrigerating apparatus and more particularly to a portable unit for maintaining ice cream or any other product in a frozen state during transportation or where such product is to be kept for some hours in a place having no facilities for preserving the frozen product.

Considering the present invention as applied to maintaining ice cream in a hardened condition, it may be stated that the retail distribution of ice cream has been for years and still is generally by way of buckets or like receptacles having cracked ice packed in salt about the can containing the ice cream, and the many disadvantages, the waste and the cost of this method are well known. With the increased use of ice cream has come the entrance of this product as part of the stock and trade of drug stores, general stores, and many other businesses which heretofore have not handled ice cream. This more general distribution of the retail seller has in some measure been due to improved methods of maintaining ice cream in bulk in a hard condition so it can be kept without loss and dispensed in small quantities as required. It has naturally followed that more and more ice cream has been purchased from such small dealers, much of it being carried home by the purchasers in whatever receptacle or container either the dealer has or the purchaser can supply. This carry home trade has brought about improvements in containers for that purpose and the conventional container now employed is a foldable box, or a cylindrical box, both made of waxed or paraffined paper which has sufficient heat resistant qualities to at least insure the ice cream being in an edible condition for a matter of minutes but which is entirely impractical for a matter of an hour or hours. It is at this point that the present invention enters the field.

Figure 1:
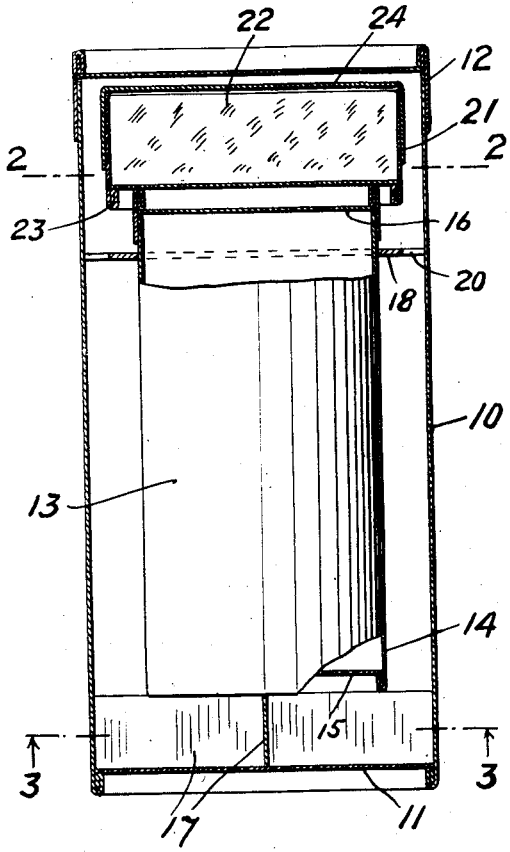
Figure 2:
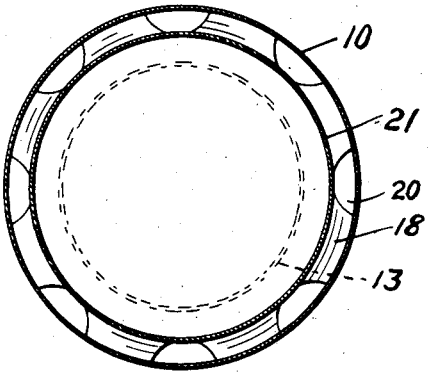
Figure 3:
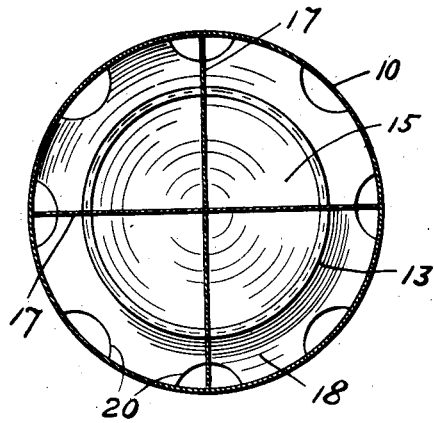
Figure 4:
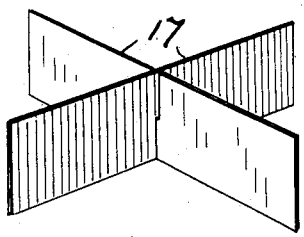
Figure 6:
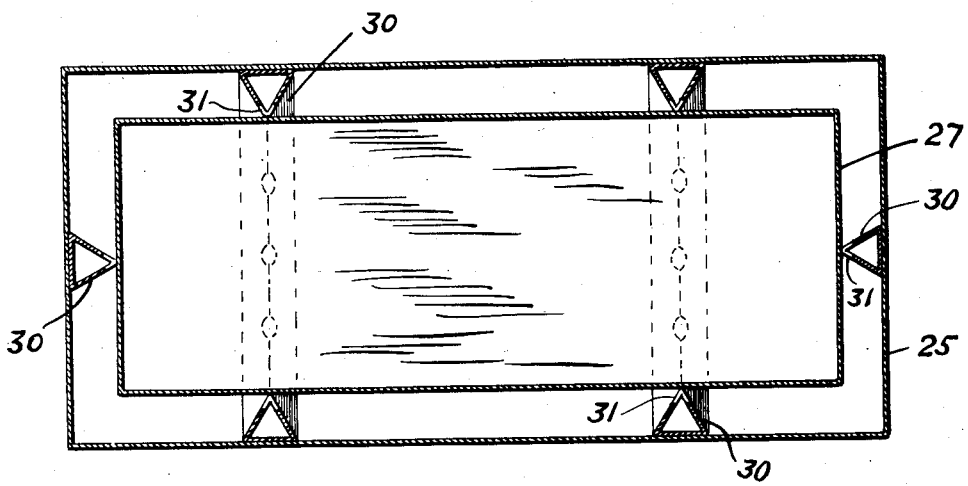
Figure 5:
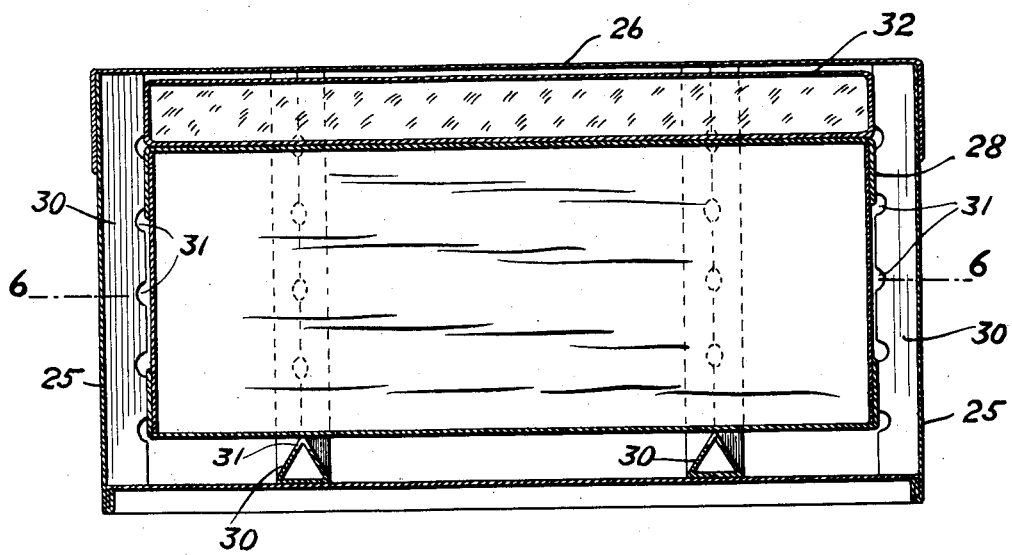
Figure 7:
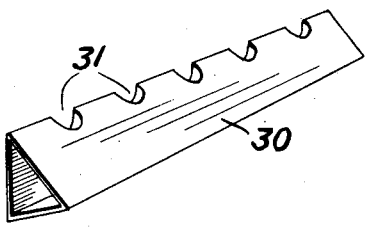

Some of the objects of the present invention are to provide an improved refrigerating unit for maintaining frozen products below the freezing point for relatively long periods and for maintaining chilled products at the necessary low temperature to preserve them in edible condition; to provide a portable refrigerating unit for one time use to temporarily preserve a food product; to provide a light, compact, efficient container unit for ice cream or other products which can be readily carried by any one and which will maintain the product frozen for days under ordinary atmospheric or room temperatures; to provide a container for frozen products having a supplemental medium for maintaining a temperature in the container below the freezing point of such products; to provide a container of such simplicity and inexpensiveness that it can be thrown away after once used; to provide an ice cream container in which the container, a supplemental refrigerant, and an outer housing may be associated as a portable discardable unit at a low cost yet with high efficiency so as to maintain the contents in usable condition for long periods; and many other objects and advantages as will be apparent as the description proceeds In the accompanying drawings, forming part of this description, Fig. 1 represents a side elevation of an assembled container, cooling box or drum and outer receptacle, partially in vertical section; Fig. 2 represents a horizontal section taken on line 2—2 of Fig. 1; Fig. 3 represents a horizontal section taken on line 3—3 of Fig. 1; Fig. 4 represents a perspective view of a spacing element between the container and the outer housing; Fig. 5 represents a sectional elevation of another form of the invention; Fig. 6 represents a section on line 6—6 of Fig. 5; and Fig 7 represents a perspective of one of the spacer elements.

Referring to the drawings, one form of the present invention consists of a receptacle 10 formed preferably of any suitable non-porous material of a heat insulating nature such as treated paper, tin or zinc shaped as desired but generally cylindrical, having a bottom 11 and a top closure 12 which is of a size to telescope well over the end of the receptacle 10. This receptacle 10 is arranged to receive a carton 13 containing the product, such as ice cream, which is to be maintained in its frozen state when the receptacle 10 is exposed to room or atmospheric temperatures, and to that end the receptacle 10 is of larger diameter or dimensions than the carton 13 to provide an unrestricted path for the circulation of air between the wall 14 of the carton 13 and the receptacle 10, and between the bottom 15 of the carton and the bottom 11 of the receptacle. This latter air path is made possible by providing a spacing element here shown as formed of crossed strips 17, though any device spacing the two bottoms and allowing free circulation of air may be employed, as will be understood.

In order to hold the carton 13 properly spaced from the inner wall of the receptacle 10, maintain it upright and substantially stable, without obstructing the free circulation of air about the carton 13, an annular spacer 18 is fixed about the carton 13, preferably at its upper end, and bridges the annular space between the two walls and makes a snug fit. The periphery of this spacer 18 is provided with scallops 20, though any form of openings may be employed to form a communication between the upper and lower compartments of the receptacle 10 as determined by the spacer 18.

As a means for maintaining the interior of the receptacle 10 cool and at a temperature below the freezing point of the contents of the carton 13, a box 21, which conforms generally to the shape of the receptacle 10, is provided, having brine or any other suitable refrigerating medium 22 therein and in assembled condition of the unit the box 21 seats upon the top of the carton 13. As here shown the box 21 has a flange 23 encircling its bottom so that the latter is held spaced from any heat conducting medium when it is not in the receptacle 10 and also allows a cooling space when the contents of the box are being cooled. A cover 24 is provided to telescope well about the body of the box and thus insulate the contents more thoroughly.

In the use of the unit of the present invention, the cartons 13 are filled with ice cream and kept in the hardening room of the plant until they are to be sent out for sale or for use. Also the boxes 21 are filled, frozen and stacked in the hardening room where they are kept in frozen condition until used. When dispensed each carton 13 is fitted with a spacer 18 and placed in one of the receptacles 10 where it rests upon the strips 17 and is thus spaced from the walls of the receptacle 10. One of the boxes 21 with its frozen refrigerant is then inserted in the receptacle 10 to rest upon the top of the carton 13, and the receptacle closure 12 is then put upon the receptacle to seal the contents from the outside air.

The unit as so assembled not only well insulates the contents of the carton 13 from outside temperatures but causes a circulation of cold air about the outside of the carton, the temperature of which is maintained below the melting point of the product by the frozen refrigerant in the box 21. Thus before melting of the product takes place the temperature must rise sufficiently to entirely melt the medium within the box 21 and as a result the contents of the cartons 13 can be maintained in a frozen state under normal conditions for days at a time.

While the foregoing has referred rather specifically to the application of the invention to ice cream and like frozen products, it is not to be understood that the invention is in any way so limited because broadly it is applicable to the transportation of any product which is to be kept at a low temperature. Thus as a "one time" use unit, it can be employed to preserve fruits, serums, films, fish and many other products and commodities for a limited time. In fact one of the first commercial embodiments of the invention was in connection with the transportation of chilled fish, and by reference to Figs. 5, 6 and 7 a form of the invention for such use will be seen wherein an outer receptacle 25 of general rectangular shape is employed having a telescoping cover 26 so that the whole as assembled surrounds an inner carton 27 which holds the packed fish or any other products. A closure 28, of the telescoping type seals the carton 27, and spacer elements 30 of substantially triangular section are located across the bottom of the carton 26, and vertically along its sides and ends in order to provide an air space entirely around the carton 27. Complete and effective circulation of the air is made possible by transversely notching the elements 30, as shown at 31, and consequently the circulation is not confined to the several chambers formed by the spacing elements 30 but can take place laterally from one to the other. The refrigerating medium is frozen in a relatively small box 32, designated for one-time use, and in assembled condition, preferably, seats upon the top of the carton 27 so that the cooled air therefrom circulates downward about the said carton 27. When the parts are assembled as above described it constitutes a unit substantially sealed against exterior air and insulated to the extent that outside temperatures have no deleterious effect upon the contents of the carton 27 until the contents of the refrigerating box 32 have melted which under ordinary conditions does not take place for days.

It will now be apparent that a complete unitary cooling package has been devised whereby the distribution of frozen or chilled products is simplified, the sale of such products greatly increased, and the expense and waste heretofore necessary reduced to a minimum. Furthermore, the condition of the frozen or chilled product is maintained salable and edible for hours and days so that such products can not only be kept in a store's stock without special provision, in the form of ice, refrigerators and the like for relatively long periods, but can be safely sold to customers to transport without danger of the product melting or spoiling.

Having thus described my invention, I claim:

1. A refrigerating merchandising unit comprising a portable receptacle, a carton containing a frozen product within said receptacle, means to support said carton spaced from the bottom of said receptacle, an annular spacer provided with openings therethrough interposed between said carton and said receptacle, a box enclosing a refrigerant and arranged within said receptacle in close proximity to the top of said carton, and a closure for sealing said receptacle.

2. A refrigerating merchandising unit comprising a portable receptacle formed of treated paper, a paper carton containing a frozen product within said receptacle, a paper box enclosing a medium having a freezing point lower than the freezing point of said product, said box being disposed together with said carton within said receptacle, and means for spacing said carton from said receptacle and formed to provide circulation about said carton.

3. A refrigerating unit comprising a portable receptacle having a closed end, a carton in said receptacle containing a product to be preserved at a low temperature, means for spacing said carton from said receptacle and formed to provide a circulation of air about the carton, a closure for the opposite end of the receptacle, and a refrigerant container disposed between said carton and closure.

Signed at Philadelphia, county of Philadelphia, State of Pennsylvania, this 23rd day of April, 1926.

GEORGE B. SCARLETT.